Sept. 20, 1960

P. M. BRYANT 2,953,156

FUEL TRANSFER SYSTEM

Filed Aug. 28, 1957

INVENTOR
PAUL M. BRYANT

BY  Jack N. McCarthy
AGENT

Sept. 20, 1960 P. M. BRYANT 2,953,156
FUEL TRANSFER SYSTEM
Filed Aug. 28, 1957 2 Sheets-Sheet 2

INVENTOR
PAUL M. BRYANT
BY Jack N. McCarthy
AGENT

United States Patent Office 2,953,156
Patented Sept. 20, 1960

2,953,156

FUEL TRANSFER SYSTEM

Paul M. Bryant, Bridgeport, Conn., assignor to United Aircraft Corporation, East Hartford, Conn., a corporation of Delaware Filed Aug. 28, 1957, Ser. No. 680,806

11 Claims. (Cl. 137—263)

This invention relates to means for removing fuel from aircraft fuel cells at normal operating attitudes of the craft and more particularly from fuel cells of a helicopter.

An object of this invention is to provide a fuel pumping system which will remove the greatest amount of fuel from a fuel cell or cells which are subject to movements which reposition the fuel therein.

Another object of this invention is to provide a fuel supply or transfer system which will use the fuel being pumped to an engine or engines by a regular fuel pump to set up a pumping action which will pump remaining fuel to said regular fuel pump.

A further object of this invention is to provide means for maintaining a fuel head on a fuel pump as long as any fuel remains in a tank.

Another object of this invention is to provide a fuel supply means which will supply fuel to an engine or engines from a multiplicity of tanks and make available for use a maximum amount of fuel possible.

A further object of this invention is to provide a fuel transfer system having a multiplicity of tanks in which the fuel is maintained at a high level in one tank as long as any fuel remains in any other tank.

Another object of this invention is to provide an ejector type pump in which fuel already pumped is used as the motive fluid to transfer other fuel to a position to be pumped from said tank.

A further object of this invention is to provide means for making use of all the fuel in the tank or tanks of aircraft subject to large changes in attitude.

These and other objects and advantages of the invention will be evident or may be pointed out in connection with the following detailed description of the drawings in which the invention is illustrated.

Figure 1:
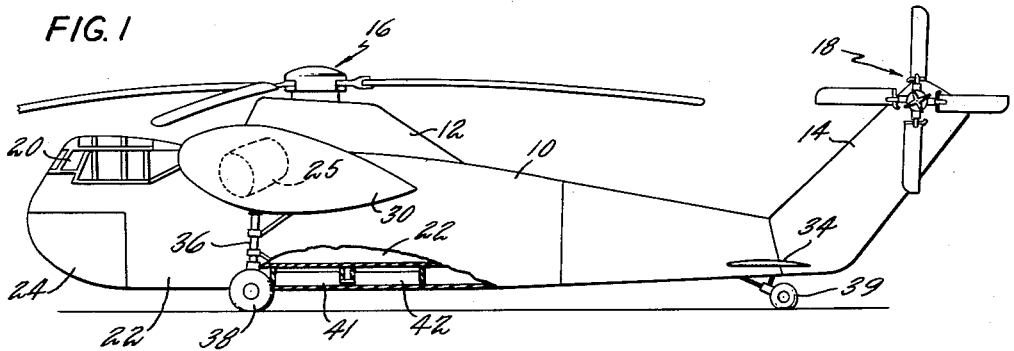
Fig. 1 is a side elevation of a helicopter showing the location of the fuel tanks.

Referring to Fig. 1, the helicopter comprises essentially an elongated fuselage 10 having a main rotor pylon 12 and a tail rotor pylon 14 on which are mounted the main rotor generally indicated at 16 and a tail rotor generally indicated at 18.

The fuselage has a pilot compartment 20 ahead of the main rotor pylon 12, which is located in the upper part of the nose section of the fuselage. The space beneath the pilot compartment extends well aft beneath the main rotor and comprises the main cargo or passenger compartment 22 of the aircraft. Access to the cargo compartment is gained through a pair of clam shell doors 24 in the nose of the fuselage. The fuel cells or tanks 41 and 42 are shown in place in the bottom of the helicopter under the cargo compartment. While these fuel containers have been shown in the bottom of the fuselage, it is to be understood that other locations may be entirely satisfactory.

Engines 25, of which two are provided, are mounted one each in engine nacelles 30. An engine nacelle 30 is supported one on each side of the fuselage 10 at the end of a short wing section. These wings project laterally from the upper portion of the fuselage in the vicinity of the main rotor pylon.

The aircraft is supported on the ground by tricycle landing gear including main oleo struts 36 by wheels 38 which depend from the nacelles 30 and by a tail wheel 39 depending from the fuselage just forward of the tail rotor pylon 14. Stabilizer surfaces 34 extend outwardly on each side of the tail pylon 14.

The main rotor is driven by an upright shaft which extends through the pylon 12 from a gear box located under said pylon. The engines are disposed in nacelles 30 to drive shafts extending through the wings into the gear box. Other details of construction of a helicopter of this type are disclosed in United States Patent No. 2,755,038, issued July 17, 1956, to M. E. Gluhareff for a Helicopter-Airplane With Engines Mounted on Fixed Wings.

Figure 2:
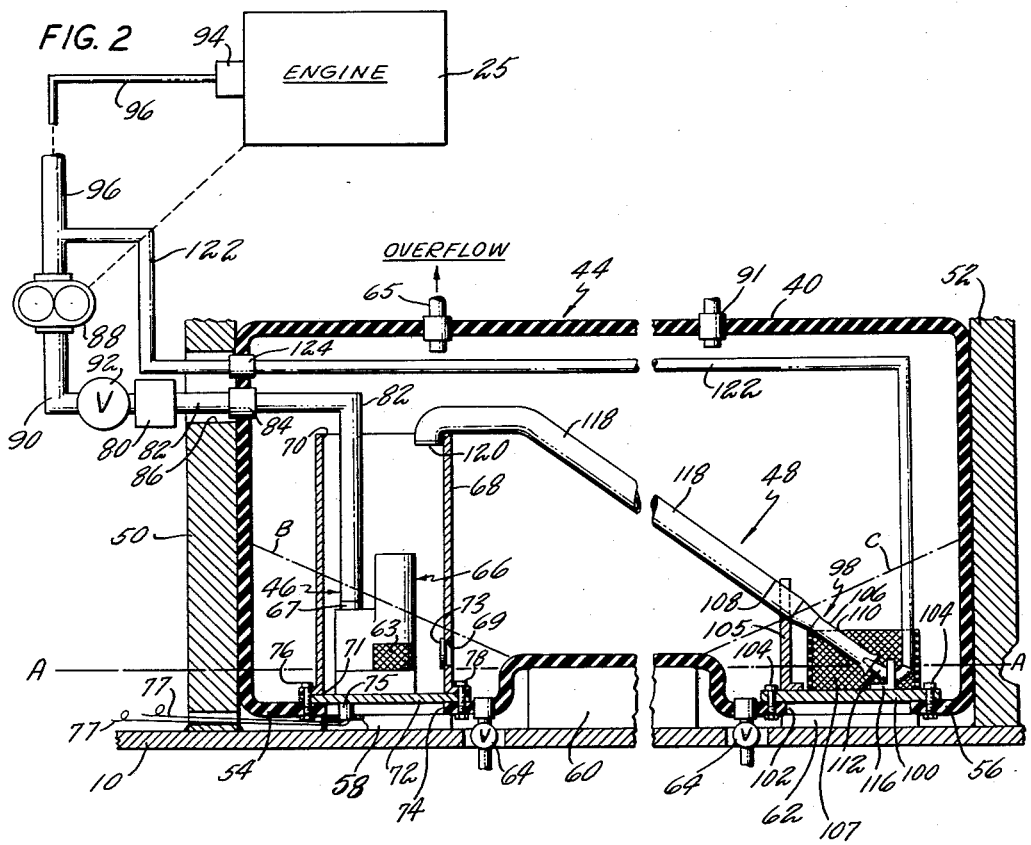
Fig. 2 is a diagrammatic view showing the fuel pumping or transfer system in a single fuel cell.

Referring to Fig. 2, the construction of the fuel supply or transfer system comprises three main parts which are the following: (1) fuel storage means 44, (2) a main pumping system 46, and (3) an auxiliary pumping system 48.

The fuel storage means 44 comprises a fuel cell, tank or bag 40 which is positioned in the bottom of the fuselage 10 between two vertical bulkheads 50 and 52. While the bag is shown generally rectangular in cross section, the bottom is formed having two sumps 54 and 56, one at each end, which collect water within the fuel and other impurities. The bottom of the fuel cell or bag 40 is supported by raised members 58, 60 and 62 which are fixed to the bottom of the fuselage 10 and generally conform to the bottom surface of the cell or bag. As noted hereinbefore, while this fuel cell or bag 40 has been shown mounted between two vertical bulkheads and resting substantially on the bottom of the aircraft, there are many other positions on the aircraft which would be equally suitable. Each sump contains a sump drain and cell defueling valve 64. An overflow connection 65 is provided at the top of the cell 40 along with a vent 91.

The main pumping system 46 comprises a fuel booster pump 66 located in the forward sump 54. Pump 66 is surrounded by an upstanding container 68 having an open upper end 70 and an open lower end 71. The fuel booster pump 66 is provided with a circular mounting plate 72 which is positioned over an opening 74 in the bottom of sump 54. Container 68 has an annular flange 76 extending outwardly from lower end 71. This flange 76 engages the top side of the outer edge of plate 72. Bolts 78 extend through annular flange 76, end of plate 72 and the bottom of sump 54 surrounding opening 74 to hold this assembly in place. Sealing means, such as a cement or washer, can be used to prevent fuel leakage at this point. An electrical connector 75 extends from below plate 72 through opening 74. Connector 75 is connected to aircraft power and conventional fuel booster pump controls by conductors 77 which controls include an "on," "off" control. Connector 75 is connected internally of pump 66 by electrical conductors to an electric motor for actuating said pump. Other similar types of pumps may be used.

The screened inlet 63 of the pump 66 is located above the bottom of the sump 54 a distance to permit water and impurities in the sump to remain there. A maximum water lever A—A is figured and the inlet placed at this point. Container 68 has an inlet opening 69 located at the same level as inlet 63. A check valve 73 is located at said inlet opening 69 which permits flow only into said container.

Fuel booster pump 66 has its outlet 67 connected to the inlet of a fuel strainer 80 by a conduit 82. A sealed connection 84 is provided in the fuel tank 40 where conduit 82 passes therethrough. The portion of the conduit 82 extending externally from the fuel tank 40 passes through an opening 86 in vertical bulkhead 50. The outlet of the fuel strainer 80 is connected to the inlet of an engine driven fuel pump 88 by conduit 90. Interposed in conduit 90 is an "on" and "off" emergency valve 92. The outlet of pump 88 is connected to an engine fuel regulating means 94 by a conduit 96. Fuel regulating means 94 can consist of a carburetor in the event a piston type engine is used and can consist of a fuel control device in the event a jet engine is used.

The auxiliary pumping system 48 comprises an auxiliary fuel pump 98 located in the rearward sump 56. Pump 98 is provided with a lower circular mounting plate 100 which is positioned over an opening 102 in the bottom of sump 56. Bolts 104 extend through the end of plate 100 and the bottom of sump 56 surrounding opening 102 to hold this pump in place. This auxiliary pump is of the ejector type having two main sections. One section comprises a tube 106 having an outlet 108 and a constricted or diverging inlet 110. The other section comprises a nozzle 112 having a discharge end located at the inlet 110. Tube 106 is mounted on plate 100 by bracket 105 and nozzle 112 is mounted on said plate by bracket 116. While one ejector configuration has been shown, it is to be understood that ejectors of other configurations may be used. The inlet of this pump is located above the bottom of the sump 56 in a manner similar to that used in locating the inlet of pump 66. A screen assembly 107 is mounted on plate 100 around the pump inlet to prevent impurities from being fed to said inlet.

The outlet 108 of fuel pump 98 has fuel directed therefrom into the upper open end 70 of container 68 by conduit 118. A check valve 120 is located at the outlet of conduit 118 which discharges into container 68 to permit flow only out of said conduit 118. The inlet of the nozzle 112 is connected to conduit 96 by conduit 122. A sealed connection 124 is provided in the fuel tank 40 where conduit 122 passes therethrough. The portion of the conduit 122 extending externally from the fuel tank 40 passes through opening 86 in vertical bulkhead 50. While the conduit 122 has been shown connected to a conduit located downstream from the engine operated pump 88, conduit 122 could also be connected to a conduit between the outlet of submerged booster pump 66 and the inlet of pump 88.

Figure 3:
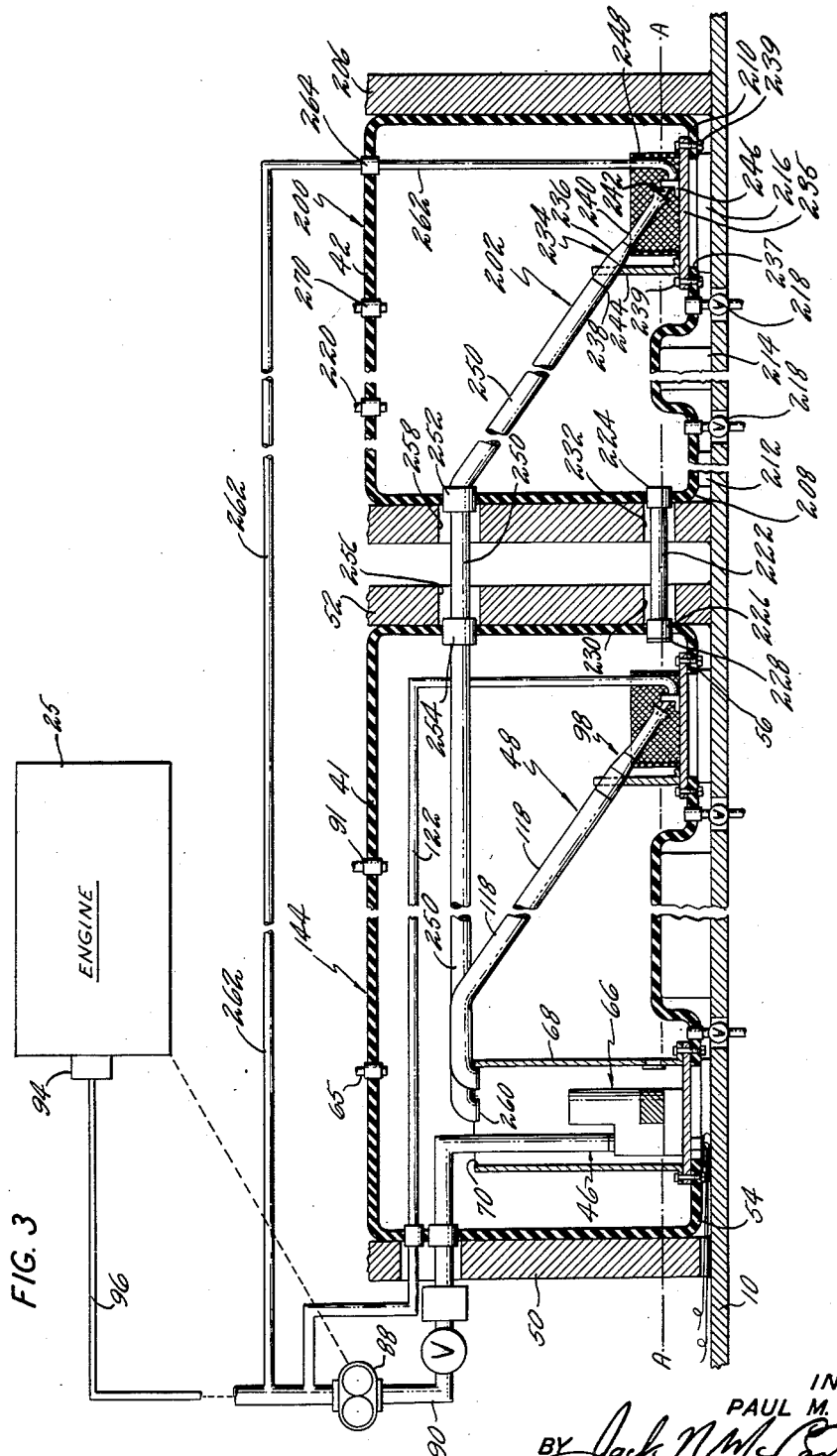
Fig. 3 is a diagrammatic view showing the fuel pumping or transfer system in a multiplicity of fuel cells.

Referring to Fig. 3, a fuel supply or transfer system is shown having two fuel storage means 144 and 200 including fuel containers 41 and 42. Fuel storage means 144 and its associated main pumping system and auxiliary pumping system are substantially identical to the construction shown in Fig. 2. In view of this, like reference numerals are placed on Fig. 3 which correspond identically to existing parts in Fig. 2 and the construction of this portion of Fig. 3 will not be redescribed here.

Fuel storage means 200 and its associated pumping system 202 have merely been integrated into a fuel supply or transfer system as shown in Fig. 2 to provide greater capacity.

The fuel storage means 200 comprises a fuel cell, tank or bag 42 which is positioned in the bottom of the fuselage 10 between two vertical bulkheads 204 and 206. While the bag is shown generally rectangular in cross section, the bottom is formed having two sumps 208 and 210, one at each end, which collect water within the fuel and other impurities. The bottom of the fuel cell or bag 42 is supported by raised members 212, 214 and 216 which are fixed to the bottom of the fuselage 10. Each sump contains a sump drain and cell de-fueling valve 218. An overflow connection 220 is provided at the top of cell 42 along with a vent 270.

Fuel cell 42 is connected to fuel cell 41 by conduit 222. One end of conduit 222 is connected to fuel cell 42 by a sealed connection 224, while the other end of conduit 222 is connected to fuel cell 41 by a similar sealed connection 226. This conduit is located so that the lower edge of its inner diameter extends along a line which corresponds to maximum water level line A—A of sumps 56 and 208. A check valve 228 is provided at the end of conduit 222 as it enters cell 41 to permit flow only from cell 42 to cell 41. Conduit 222 passes through openings 230 and 232 in bulkheads 52 and 204, respectively.

The associated pumping system 202 comprises a fuel pump 234 located in the rearward sump 210. Pump 234 is provided with a lower circular mounting plate 235 which is positioned over an opening 237 in the bottom of sump 210. Bolts 239 extend through the end of plate 235 and the bottom of sump 210 surrounding opening 237 to hold this pump in place. This pump is of the ejector type having two main sections. One section comprises a tube 236 having an outlet 238 and a constricted inlet 240. The other section comprises a nozzle 242 having a discharge end located at the inlet 240. Tube 236 is mounted on plate 235 by bracket 244 and nozzle 242 is mounted on said plate by bracket 246. The inlet of this pump is located above the bottom of the sump 210 in a manner similar to that used in locating the inlet of pump 66. A screen assembly 248 is mounted on plate 235 around the pump inlet to prevent impurities from being fed to said inlet.

The outlet 238 of fuel pump 234 has fuel directed therefrom into the upper open end 70 of container 68 in fuel cell 41 by conduit 250. A sealed connection 252 is provided in a fuel tank 42 where conduit 250 passes therethrough and a like sealed connection 254 is provided in the fuel tank 41 where conduit 250 passes therethrough. The portion of the conduit 250 between cells 41 and 42 passes through openings 256 and 258 and bulkheads 52 and 204, respectively. A check valve 260 is located at the outlet of conduit 250 which discharges into container 68 to permit flow only out of said conduit 250. The inlet of nozzle 242 is connected to conduit 96 by conduit 262. A sealed connection 264 is provided in a fuel tank 42 where conduit 262 passes therethrough. While the conduit 262 has been shown connected to a conduit located downstream from the engine operated pump 88, conduit 262 could also be connected to a conduit between the outlet of submerged booster pump 66 and the inlet of pump 88.

*Operation*

In the construction shown in Fig. 2, fuel is supplied to the engine from fuel tank 40 in the following manner. After the pilot has started the engine 25 and the submerged booster pump 66 by ordinary controls, the single tank construction shown will assure that the maximum amount of fuel which is available in the tank will be pumped to the engine. In the past in aircraft operation a nose down or nose up flying attitude could place fuel in a fuel tank in a position unavailable to be pumped therefrom. This arrangement prevents this from occurring.

With an aircraft in level flight, fuel from tank 40 is pumped from one end by pump 66 to an engine driven fuel pump 88 where it is then pumped to an engine fuel control. Fuel at this end of tank 40 reaches the pump 66 in container 68 through the top of said container or through check valve 73 if the fuel level is below said top. Fuel from the other end of tank 40 is pumped into container 68 by ejector 98. Motive fluid is supplied to said ejector 98 by means of conduit 122 which, while shown connected downstream from the engine operated pump 88, can also be connected downstream of pump 66 between the outlet of pump 66 and the inlet of pump 88.

Now, when the aircraft assumes a nose down position and the amount of fuel in the fuel tank is such that the inlet of ejector 98 is uncovered, as shown, for example, by dot and dash line B, fuel pump 66 will be operating to supply fuel to engine 25 directly. When the aircraft assumes a nose up position and the amount of fuel therein is such that the inlet of pump 66 is uncovered, as shown by dot and dash line C, ejector 98 will be operating to supply fuel to container 68 from where it will be pumped to the engine by pump 66.

In a construction as shown in Fig. 3, the pilot can use the same procedure to start the engine 25 and the submerged booster pump 66 as before. With an aircraft in level flight, fuel from tank 41 is pumped to the engine 25 in the same manner as just described above in the operation of the construction of Fig. 2. One end of fuel tank 42 is connected to one end of tank 41 by conduit 222. This conduit will permit fuel in tank 42 to pass into tank 41. Check valve 228 prevents fuel from flowing from tank 41 to tank 42. Fuel from the other end of tank 42 is pumped into container 68 in tank 41 by ejector 234. Motive fluid is supplied to ejector 234 in the same manner as to ejector 98.

Now, when the aircraft assumes a nose down position and the amount of fuel in fuel tank 41 is such that the inlet of ejector 98 is uncovered and the amount of fuel in fuel tank 42 is such that the inlet of ejector 234 is uncovered, fuel pump 66 will be operating to supply fuel to engine 25 directly and conduit 222 will be acting to supply the remaining fuel in tank 42 to tank 41. When the aircraft assumes a nose up position and the amount of fuel in fuel tank 41 is such that the inlet of pump 66 is uncovered, ejector 98 will be operating to supply the remaining fuel in fuel tank 41 to container 68 and ejector 234 will also be operating to supply fuel in tank 42 to container 68. From container 68 this fuel will then be pumped to the engine by pump 66. Check valve 228 permits the fuel to be maintained at a high level in tank 41 while being depleted in tank 42. This would be used where an effort was being made to keep the fuel position at a favorable location with respect to the center of gravity of the aircraft.

If a common fuel level in both tanks is not objectionable, the auxiliary pumping system 48 can be removed from tank 41 along with check valve 228. In a construction of this type, the two tanks 41 and 42 would be acting essentially as a single tank. A nose down position of an aircraft would permit the fuel in tank 42 to flow into tank 41 to be pumped with fuel therein and a nose up position of an aircraft would permit the fuel in tank 41 to flow into tank 42 to be pumped with fuel therein to container 68.

It is to be understood that the invention is not limited to the figures herein shown and described, but may be used in other ways without departure from its spirit as defined in the following claims.

I claim:

1. A fuel supply system comprising a fuel cell, said fuel cell having a first sump located in one end and a second sump located in the other end for collecting the last of any fuel in said cell, a container, a first pump, said first pump having an inlet and outlet, the inlet of said first pump being connected to the bottom of said container, first conduit means for directing fuel from the outlet of said first pump, a second pump, said second pump having an inlet and outlet, the inlet of said second pump being located adjacent the second of said sumps at a point below which no fuel is to be pumped, said container having an opening, second conduit means for directing fuel from the outlet of said second pump into said container through said opening, means connecting the bottom of said container to said fuel cell adjacent the first of said sumps at a point below which no fuel is to be pumped, and a one-way check valve in said means permitting flow only from said fuel cell into said container.

2. A fuel supply system comprising a fuel cell, said fuel cell having a first sump located in one end and a second sump located in the other end for collecting the last of any fuel in said cell, a container, a first pump, said first pump having an inlet and outlet, the inlet of said first pump being connected to the bottom of said container, first conduit means for directing fuel from the outlet of said first pump, a second pump, said second pump having an inlet and outlet, the inlet of said second pump being located adjacent the second of said sumps at a point below which no fuel is to be pumped, said container having an opening, second conduit means for directing fuel from the outlet of said second pump into said container through said opening, means connecting the bottom of said container to said fuel cell adjacent the first of said sumps at a point below which no fuel is to be pumped, and a one-way check valve in said means permitting flow only from said fuel cell into said container, said second pump being responsive to said first pump whereby said second pump operates whenever said first pump is pumping.

3. A fuel supply system comprising a fuel cell, said fuel cell having a first sump located in one end and a second sump located in the other end for collecting the last of any fuel in said cell, a container, a first pump, said first pump having an inlet and outlet, the inlet of said first pump being connected to the bottom of said container, first conduit means for directing fuel from the outlet of said first pump, a second pump, said second pump having an inlet and outlet, the inlet of said second pump being located adjacent the second of said sumps at a point below which no fuel is to be pumped, said container having an opening, second conduit means for directing fuel from the outlet of said second pump into said container through said opening, means connecting the bottom of said container to said fuel cell adjacent the first of said sumps at a point below which no fuel is to be pumped, a one-way check valve in said means permitting flow only from said fuel cell into said container, said second pump being an ejector, and third conduit means connecting said first conduit means to said ejector for providing the motive fluid therefor, said ejector being operated whenever said first pump is pumping.

4. A fuel supply system comprising a fuel cell, said fuel cell having a first sump located in one end and a second sump located in the other end for collecting the last of any fuel in said cell, a container within said fuel cell, said container being located adjacent said first sump, a first pump, said first pump having an inlet and outlet, the inlet of said first pump being located adjacent the bottom of said container, a second pump, said second pump having an inlet and outlet, the inlet of said second pump being located adjacent said second sump, said container having an opening, conduit means for directing fuel from the outlet of said second pump into said container through said opening, said container having a one-way check valve adjacent its bottom permitting flow only from said fuel cell into said container.

5. A fuel supply system comprising a fuel cell, said fuel cell having a first sump located in one end and a second sump located in the other end for collecting the last of any fuel in said cell, a container within said fuel cell, said container being located adjacent said first sump, a first pump, said first pump having an inlet and outlet, the inlet of said first pump being located adjacent the bottom of said container, a second pump, said second pump having an inlet and outlet, the inlet of said second pump being located adjacent said second sump, said container having an opening, and conduit means for directing fuel from the outlet of said second pump into said container through said opening, said container having a one-way check valve adjacent its bottom permitting flow only from said fuel cell into said container, said second pump being responsive to said first pump whereby said second pump operates whenever said first pump is pumping.

6. A fuel supply system comprising a fuel cell, said fuel cell having a first sump located in one end and a second sump located in the other end for collecting the last of any fuel in said cell, a container within said fuel cell, said container being located adjacent said first sump, a first pump, said first pump having an inlet and outlet, the inlet of said first pump being located adjacent the bottom of said container, first conduit means for directing fuel from the outlet of said first pump, a second pump, said second pump having an inlet and outlet, the inlet of said second pump being located adjacent said second sump, said container having an opening, second conduit means for directing fuel from the outlet of said second pump into said container through said opening, said container having a one-way check valve adjacent its bottom permitting flow only from said fuel cell into said container, said second pump being an ejector, and third conduit means connecting said first conduit means to said ejector for providing the motive fluid therefor, said ejector being operated whenever said first pump is pumping.

7. A fuel supply system comprising a fuel cell, said fuel cell having a first sump located in one end and a second sump located in the other end for collecting the last of any fuel in said cell, a container within said fuel cell, said container being located adjacent said first sump, a first pump, said first pump having an inlet and outlet, the inlet of said first pump being located adjacent the bottom of said container, a second pump, said second pump having an inlet and outlet, the inlet of said second pump being located adjacent said second sump at a point below which no fuel is to be pumped, said container having an opening, and conduit means for directing fuel from the outlet of said second pump into said container through said opening, said container having a one-way check valve adjacent its bottom at a point below which no fuel is to be pumped permitting flow only from said fuel cell into said container.

8. A fuel supply system for a vehicle comprising first and second fuel cells, said fuel cells being located on substantially the same plane, said first cell having its forward end in front of the forward end of the second cell, the forward end cell of the second cell being connected to the first cell by a first conduit means, the forward end of the first cell having a container therein, said container having a one-way valve adjacent its bottom permitting flow only from said first fuel cell into said container, a first pump, said pump being located in said container, second conduit means for directing fuel pumped by said first pump to the exterior of said first cell, a second pump, said second pump being located in the rearward end of said second cell, and third conduit means for directing fuel pumped by said second pump into said container.

9. A fuel supply system for a vehicle comprising first and second fuel cells, said fuel cells being located on substantially the same plane, said first cell having its forward end in front of the forward end of the second cell, the forward end of the second cell being connected to the first cell by a first conduit means, the forward end of the first cell having a container therein, said container having a one-way valve adjacent its bottom permitting flow only from said first fuel cell into said container, a first pump, said pump being located in said container, second conduit means for directing fuel pumped by said first pump to the exterior of said first cell, a second pump, said second pump being located in the rearward end of said first cell, third conduit means for directing fuel pumped by said second pump into said container, a third pump, said third pump being located in the rearward end of said second cell, and fourth conduit means for directing fuel pumped by said third pump into said container.

10. A fuel supply system for a vehicle comprising first and second fuel cells, said fuel cells being located on substantially the same plane, said first fuel cell having a first sump located in one end and a second sump in its other end, said second fuel cell having a third sump in one end and a fourth sump in its other end, said first cell having its forward end in front of the forward end of the second cell, the forward end of the second cell being connected to the first cell by a first conduit means, the forward end of the first cell having a container therein located adjacent said first sump, said container having a one-way valve adjacent its bottom permitting flow only from said first fuel cell into said container, a first pump, said pump being located in said container, second conduit means for directing fuel pumped by said first pump to the exterior of said first cell, a second pump, said second pump being located in the rearward end of said second cell adjacent said fourth sump, third conduit means for directing fuel pumped by said second pump into said container.

11. A fuel supply system for a vehicle comprising first and second fuel cells, said fuel cells being located on substantially the same plane, said first fuel cell having a first sump located in one end and a second sump in its other end, said second fuel cell having a third sump in one end and a fourth sump in its other end, said first cell having its forward end in front of the forward end of the second cell, the forward end of the second cell being connected to the first cell by a first conduit means, the forward end of the first cell having a container therein located adjacent said first sump, said container having a one-way valve adjacent its bottom permitting flow only from said first fuel cell into said container, a first pump, said pump being located in said container, second conduit means for directing fuel pumped by said first pump to the exterior of said first cell, a second pump, said second pump being located in the rearward end of said first cell, third conduit means for directing fuel pumped by said second pump into said container, a third pump, said third pump being located in the rearward end of said second cell adjacent said fourth sump, and fourth conduit means for directing fuel pumped by said third pump into said container.

References Cited in the file of this patent

UNITED STATES PATENTS

| | | |
|---|---|---|
| 2,300,332 | Avigdore | Oct. 27, 1942 |
| 2,361,747 | Curtis | Oct. 31, 1944 |
| 2,425,957 | Samelson | Aug. 19, 1947 |
| 2,442,639 | Curtis | June 1, 1948 |
| 2,479,210 | Compton | Aug. 16, 1949 |
| 2,516,150 | Samiran | July 25, 1950 |
| 2,530,357 | Kateley | Nov. 14, 1950 |
| 2,547,246 | Aspelin | Apr. 3, 1951 |
| 2,654,553 | Noon et al. | Oct. 6, 1953 |
| 2,821,993 | Pacey | Feb. 4, 1958 |

FOREIGN PATENTS

| | | |
|---|---|---|
| 656,741 | France | Jan. 5, 1929 |
| 692,452 | Germany | June 20, 1940 |

UNITED STATES PATENT OFFICE

CERTIFICATE OF CORRECTION

Patent No. 2,953,156            September 20, 1960

Paul M. Bryant

It is hereby certified that error appears in the printed specification of the above numbered patent requiring correction and that the said Letters Patent should read as corrected below.

Column 7, line 42, strike out "cell", first occurrence.

Signed and sealed this 11th day of April 1961.

(SEAL)
Attest:
ERNEST W. SWIDER
Attesting Officer

ARTHUR W. CROCKER
Acting Commissioner of Patents